UNITED STATES PATENT OFFICE.

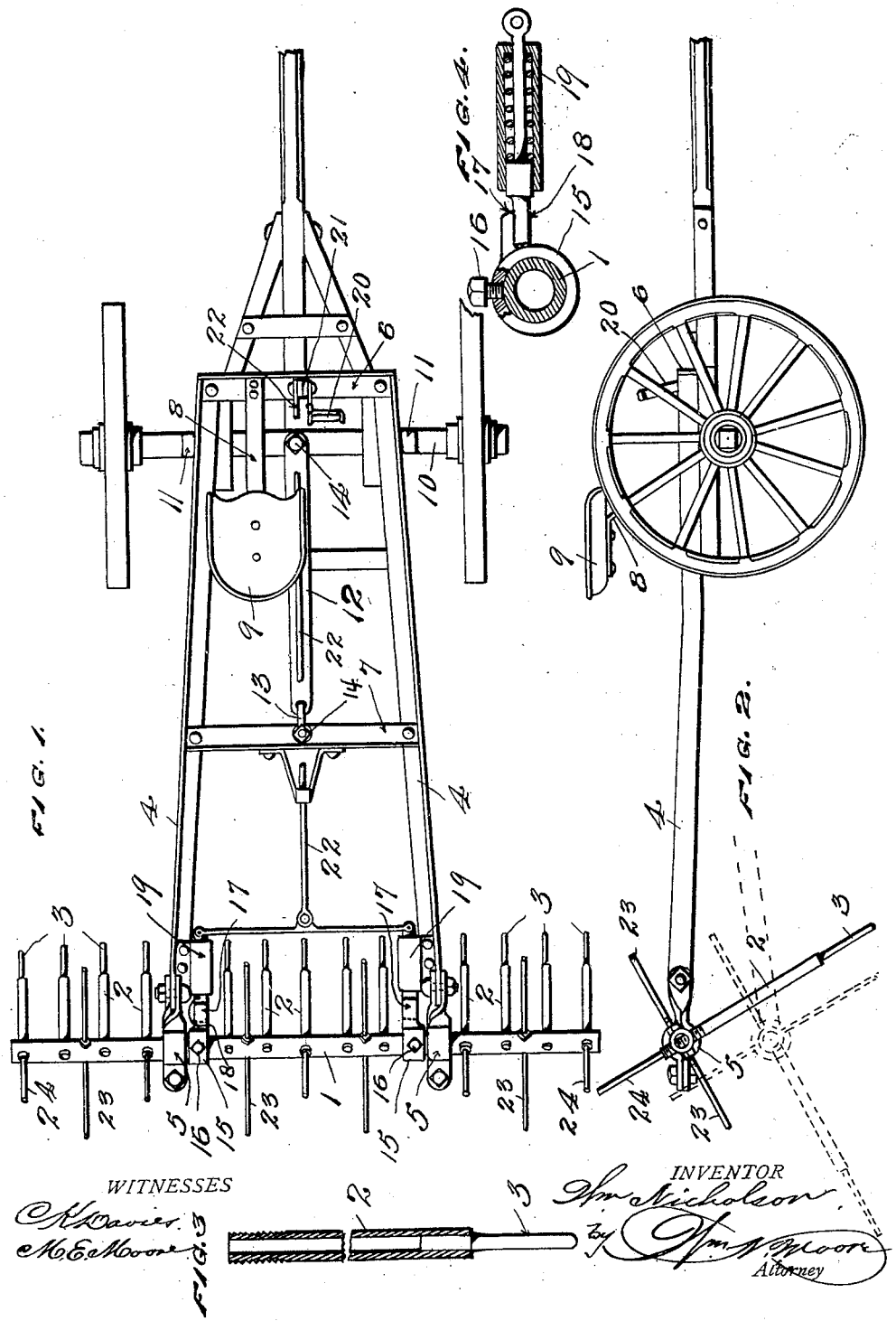

WILLIAM NICHOLSON, OF FINDLAY, ILLINOIS.

STALK-RAKE.

No. 925,129.  Specification of Letters Patent.  Patented June 15, 1909.

Application filed March 10, 1908. Serial No. 420,159.

*To all whom it may concern:*

Be it known that I, WILLIAM NICHOLSON, a citizen of the United States, residing at Findlay, in the county of Shelby and State of Illinois, have invented certain new and useful Improvements in Stalk-Rakes, of which the following is a specification.

My invention relates to improvements in stalk rakes, and has for its object the provision of a simple and practical device for raking or gathering up corn stalks or like material and which will be efficient for the purposes intended.

Another object of the invention is the provision of a device of this character of light and inexpensive construction which may be used for various purposes such as for raking hay, stubble, grain, brush and the like, and which when sufficient material has been collected, may be actuated to dump the material and which will automatically right itself after the dumping operation.

Another object of my invention is to provide an improved form of rake teeth having detachable points of more yielding material than the body of the teeth, so that if in course of the work, the teeth should encounter an obstruction such as a stump or a rock, the point of the teeth will yield or break thereby acting as a safeguard to preserve the other parts of the device from injury.

A further object is the provision of simple means for adjusting the slant of the rake teeth and for permitting dumping of the rake.

The invention comprises a raking device embodying certain novel features of construction, combination and arrangement of parts substantially as disclosed herein and illustrated in the accompanying drawings, in which:

Figure 1, is a plan view of the invention as in use, it being coupled to the front axle of the running gear of a wagon. Fig. 2, is a side elevation of the same, showing in dotted lines the manner in which the rake head revolves for dumping the load. Fig. 3, is a detail sectional view of one of the rake teeth. Fig. 4 is a detailed view of a part of the rake.

My invention is in the nature of a drag rake, in which the rake teeth ride over the ground and sustain the weight of the rake head, the rake preferably being connected to the running gear of a vehicle as illustrated.

The numeral 1, designates the rake head, preferably in the form of a tubular member or pipe which possesses the combined advantages of strength and light weight. The rake teeth consist of the tubular members or sleeves 2, secured at the proper distances apart in the head, the upper ends of these members being left open, and the rake points 3, being held in the lower ends of the tubular members. These detachable points are preferably made of wood or some such inexpensive and easily breakable material, so that when an obstruction is encountered the particular rake point or points will break off and no permanent damage will be done to the rake. The stubs of the broken points may be driven out by entering a tool or rod in the open upper ends of the tubular teeth, and new points may then be inserted. Draft bars or sills 4, are connected to the rake head by the looped journal members 5, the forward ends of the sills, being connected by a cross bar 6, and a transverse brace 7, secured between the sills midlength serving to hold the rearward portion of the sills properly spaced. The sills and cross braces thus form a frame for the support of the seat post 8, carrying the driver's seat 9. The draft frame by which the rake is drawn is preferably made of angle iron on account of its lightness, strength and durability.

The rake is preferably operated in connection with a pair of wheels which serve to support the forward end of the draft frame, the front axle and wheels of the running gear of an ordinary farm wagon serving admirably for this purpose, although of course a special set of wheels and supporting axle may be used. In this connection the sills rest upon the bolster 10, and are held against side play by the side stakes 11. A coupler bar 12, is connected by links 13, to the intermediate cross bar of the frame and the forward end of the coupler is engaged by the king pin or bolt 14, this coupler bar thus serving as the draft coupling for the device.

A pair of collars 15, are adjustably held on the rake head between the ends of the sills by set screws 16, each collar having a tongue or projection 17. These projections on the collars serve as abutments to prevent rotation of the rake head, being adapted to engage the spring pressed sliding bolts 18, engaged in the boxings 19, carried on the rearward portions of the sills. By adjusting the position of the abutment collars the inclination of the rake teeth may be changed to suit different conditions and requirements.

After a load has been gathered, it is dumped in the following manner: A foot lever 20, is pivoted in a bracket 21, within convenient reach of the operator, and rods or wires 22, serve as connections between the foot lever and sliding bolts. As the rake head is only held against rotation by means of the abutment collars bearing upon the projecting ends of the sliding bolts, when the sliding bolts are withdrawn from engagement by the abutments, by operating the foot lever, the rake head is free to rotate, which it does, dropping the material in a bunch. Outstanding spurs or spokes 23, are mounted in the rake head at right angles with respect to the rake teeth and upstanding spokes 24, are provided on the top of the rake head, so that when the head commences to rotate, these outstanding members serve as spokes, engaging the ground and causing the head to make a complete revolution, until the abutments again engage the sliding bolts and the rake teeth again become operative.

From the foregoing description taken in connection with the drawings it will be evident that I have produced a rake of extremely light, simple and inexpensive construction, which is thoroughly practical and which accomplishes all the objects herein set forth.

I claim:

1. A rake comprising a draft frame, a rake head rotatably held in said frame, teeth carried by said head, and means for holding the head against rotation, said means consisting of collars, set screws carried by the collars engaging the shaft to hold said collars adjusted tongues or projections on said collars and spring press sliding bolts adapted to engage said tongues or projections.

2. A rake comprising draft sills, a rake head rotatably held in said draft sills, rake teeth carried by the head and having detachable easily breakable points, and means for holding the head against rotation and for adjusting the inclination of the teeth, said means consisting of collars, set screws carried by the collars engaging the shaft to hold said collars adjusted tongues or projections on said collars and spring press sliding bolts adapted to engage said tongues or projections.

3. A rake comprising a draft frame, means for coupling said frame to a vehicle, a rake head rotatably held in the draft frame, teeth carried in the head, said teeth each comprising a tubular member and a point held in said member, said point being readily breakable, collars mounted on the shaft of the rake, means for holding the collars at the proper adjustment, projections formed on said collars spring sliding bolts for engaging said projections and means for operating said sliding bolts.

In testimony whereof I affix my signature, in presence of two witnesses.

WILLIAM NICHOLSON.

Witnesses:
T. A. DAVIS,
S. L. BRADLEY.